(12) United States Patent
Takahashi

(10) Patent No.: US 8,974,234 B2
(45) Date of Patent: Mar. 10, 2015

(54) ROTARY CONNECTOR

(71) Applicant: Alps Electric Co., Ltd., Ota-ku, Tokyo (JP)

(72) Inventor: Seishi Takahashi, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 43 days.

(21) Appl. No.: 13/951,074

(22) Filed: Jul. 25, 2013

(65) Prior Publication Data

US 2014/0057462 A1 Feb. 27, 2014

(30) Foreign Application Priority Data

Aug. 23, 2012 (JP) ................................. 2012-184417

(51) Int. Cl.
| | | |
|---|---|---|
| *H01R 39/00* | (2006.01) | |
| *B60R 16/027* | (2006.01) | |
| *H01R 35/04* | (2006.01) | |
| *H01R 35/02* | (2006.01) | |

(52) U.S. Cl.
CPC .............. *B60R 16/027* (2013.01); *H01R 35/04* (2013.01); *H01R 35/025* (2013.01)
USPC .......................................... 439/15; 439/164

(58) Field of Classification Search
CPC ...... H01R 35/025; H01R 35/04; H01R 39/00; H01R 39/64; H01R 2103/00; H01R 39/643; H01R 13/652; H01R 35/02; H01R 2201/26

USPC ................................... 439/13, 15, 16, 164, 64
See application file for complete search history.

(56) References Cited

U.S. PATENT DOCUMENTS

| | | | |
|---|---|---|---|
| 5,690,500 A | * | 11/1997 | Ishikawa et al. ............... 439/164 |
| 7,758,362 B2 | * | 7/2010 | Oishi ............................. 439/164 |
| 2009/0176393 A1 | * | 7/2009 | Asakura et al. ............... 439/164 |

FOREIGN PATENT DOCUMENTS

| | | |
|---|---|---|
| JP | 8-280127 | 10/1996 |
| JP | 2006-086043 | 3/2006 |

* cited by examiner

*Primary Examiner* — Abdullah Riyami
*Assistant Examiner* — Thang Nguyen
(74) *Attorney, Agent, or Firm* — Hunton & Williams LLP

(57) ABSTRACT

In a rotary connector where a moving body turning with the rotation and revolution of a planetary gear and a flat cable including an inverted portion at a middle portion thereof are received in an annular space defined between an outer cylindrical body of a stationary-side housing and an inner cylindrical body of a movable-side housing, regulating walls, which extend in a circumferential direction with an opening interposed therebetween, are erected on a moving body formed of a resin molded product and the inverted portion passes through the opening so that the movement of the flat cable in a radial direction is regulated. Further, a plurality of protrusions, which protrude toward the inner peripheral surface of the outer cylindrical body, are repeatedly formed in the circumferential direction on the outer peripheral surfaces of the regulating walls.

9 Claims, 7 Drawing Sheets

ROTARY CONNECTOR

CLAIM OF PRIORITY

This application contains subject matter related to and claims the benefit of Japanese Patent Application No. 2012-184417 filed on Aug. 23, 2012, the entire contents of which is incorporated herein by reference.

BACKGROUND OF THE DISCLOSURE

1. Field of the Disclosure

The present disclosure relates to a rotary connector that is assembled with a steering device of an automobile and is used as electrical connection means of an air bag system, and more particularly, to a rotary connector where a flat cable is reversely wound through an inverted portion of the flat cable in an annular space formed between a stationary-side housing and a movable-side housing.

2. Description of the Related Art

A rotary connector is a connector in which a stationary-side housing including an outer cylindrical body and a movable-side housing including an inner cylindrical body are rotatably disposed coaxially with each other and flat cables are received and wound in an annular space defined between the outer cylindrical body and the inner cylindrical body, and is used as electrical connection means of an air bag inflator that is mounted on a steering wheel, such as a steering device of an automobile, of which the number of times of rotation is finite. The flat cable is a strip-shaped body in which a conductor is supported on an insulating film, and a spiral type in which the flat cable is spirally wound and an inversion type in which the flat cable is wound so as to be inverted at a middle portion thereof have been known. Since the length of the flat cable can be significantly shortened in the latter, that is, the inversion type, it has become more mainstream.

In the related art, a rotary connector where a method of winding a flat cable includes an inversion type as described above, a roller holder in which a guide wall and a plurality of support shafts are erected on a ring-shaped rotating plate is turnably disposed in an annular space, rollers are rotatably mounted on the respective support shafts of the roller holder, and an inverted portion of the flat cable passes through an opening formed between the guide wall and one roller facing the guide wall (as described in, for example, Japanese Unexamined Patent Application Publication No. 2006-86043). In the rotary connector having such a structure, when the movable-side housing rotates relative to the stationary-side housing in any one direction of a normal direction and a reverse direction, the flat cable is fed from the outer cylindrical body so as to be tightly wound on the inner cylindrical body or, conversely, is fed from the inner cylindrical body so as to be rewound on the outer cylindrical body according to the rotation direction of the movable-side housing. At that time, the inverted portion of the flat cable is moved in the same direction as the direction of the movable-side housing by a rotation angle smaller than the rotation angle of the movable-side housing, the roller holder is also moved in the same direction so as to follow the inverted portion, and the flat cable of which the length is about double the moving distances of the inverted portion and the roller holder is fed from the outer cylindrical body or the inner cylindrical body. That is, the roller holder receives a driving force (a pulling force or a pressing force) from the inverted portion of the flat cable and turns in the annular space, and the movement of the flat cable in the radial direction is regulated by the plurality of rollers mounted on the roller holder as described above. Accordingly, the flat cable is smoothly fed toward the inverted portion.

Further, a conventional rotary connector in which a moving body supporting a planetary gear is disposed in an annular space instead of the roller holder and the moving body is rotated at the same speed as the speed of an inverted portion of a flat cable with the rotation (rotation and revolution) of the planetary gear (as described in, for example, Japanese Unexamined Patent Application Publication No. 8-280127). In such a rotary conntector, a plurality of rollers are rotatably supported on the surface side of the moving body, and the inverted portion of the flat cable passes through an opening formed between arbitrary rollers. Furthermore, the planetary gear is rotatably supported on the back side of the moving body, and the planetary gear meshes with both an internal gear provided on a stationary-side housing and a sun gear provided on a movable-side housing. In the rotary connector having such a structure, when the movable-side housing rotates relative to the stationary-side housing, the planetary gear meshing with the internal gear and the sun gear rotates at a predetermined reduction gear ratio. Accordingly, the moving body supporting the planetary gear rotates and moves in the annular space, and the inverted portion of the flat cable also moves in the annular space at the same speed as the speed of the opening of the moving body.

Since the roller holder receives a driving force (a pulling force or a pressing force) from the inverted portion of the flat cable and turns in the annular space in the rotary connector in the related art disclosed in Japanese Unexamined Patent Application Publication No. 2006-86043 as described above, the suitable stiffness is necessary in the flat cable. For this reason, a flat cable of which the insulating film is thick and which has high stiffness should be used. In contrast, in the rotary connector in the related art disclosed in Japanese Unexamined Patent Application Publication No. 8-280127, it is possible to move the opening of the moving body and the inverted portion of the flat cable at the same speed in the annular space by appropriately setting the gear ratio of the respective gears, including the planetary gear. Accordingly, since the moving body does not require a driving force applied from the inverted portion of the flat cable, a flat cable, which uses a thin insulating film, is inexpensive, and has low stiffness (stiffness represented by Young's modulus (unit: MPa)), can be used. However, since the movement of the flat cable in the radial direction is regulated by the plurality of rollers that are rotatably mounted on the support shafts of the moving body, there is a problem in that the structure is complicated and rattle is likely to form due to the spaces between the rollers and the support shafts.

These and other drawbacks exist.

SUMMARY OF THE DISCLOSURE

Embodiments of the disclosure provide a rotary connector that can achieve the structural simplification and the reduction of noise.

According to an exemplary embodiment, a rotary connector includes: a stationary-side housing that includes an outer cylindrical body; a movable-side housing that includes an inner cylindrical body facing the outer cylindrical body and is disposed coaxially with the stationary-side housing; a flat cable which is received in an annular space defined between the outer and inner cylindrical bodies so that the winding direction of the flat cable is reversed at a middle portion of the flat cable, and of which both ends are fixed to the stationary-side housing and the movable-side housing, respectively; and a moving body which is turnably disposed in the annular space and includes an opening through which an inverted portion of the flat cable passes. A planetary gear supported by the moving body meshes with an internal gear provided on the stationary-side housing and a sun gear provided on the movable-side housing. Regulating walls, which extend in a circumferential direction of the annular space with the opening interposed therebetween, are erected on the moving body, and a plurality of protrusions, which protrude toward an inner peripheral surface of the outer cylindrical body, are repeatedly formed on outer peripheral surfaces of the regulating walls at regular intervals in the circumferential direction so that the total number N of the protrusions satisfies "11≤N≤35".

In the rotary connector having the above-mentioned structure, the regulating walls, which extend in the circumferential direction with the opening interposed therebetween, are erected on the moving body, which turns in the annular space with the rotation and revolution of the planetary gear, and the inverted portion passes through the opening so that the movement of the flat cable in the radial direction is regulated. Accordingly, it is possible to simplify the structure of the moving body in the form of an integrated part and to reduce noise since rollers are not needed. Further, the plurality of protrusions, which protrude toward the inner peripheral surface of the outer cylindrical body, are repeatedly formed on the outer peripheral surfaces of the regulating walls at regular intervals in the circumferential direction so that the total number N of the protrusions satisfies "11≤N≤35". Accordingly, since the number of parts of the moving body is reduced and assembly is simplified, cost is reduced. Furthermore, since it is possible to reduce the sliding friction force that is generated between the flat cable and the outer peripheral surfaces of the regulating walls of the moving body, it is possible to smoothly rotate the movable-side housing.

Here, when the total number N of the protrusions is smaller than 11 and when the total number N of the protrusions exceeds 35, it is difficult to smoothly rotate the movable-side housing. For example, when the total number N of the protrusions is smaller than 11, a large slack portion (bulge) is likely to be formed due to the slack occurring on the flat cable that is fed to the outer cylindrical body from the inner cylindrical body. Further, since the flat cable is not fed to the outer cylindrical body by a length corresponding to the slack portion when the slack portion is formed on the flat cable, the flat cable wound on the outer cylindrical body is pulled toward the inner cylindrical body. As a result, the flat cable presses the outer peripheries of the regulating walls of the moving body, so that a sliding friction force generated between the flat cable and the regulating walls of the moving body is increased. For this reason, since it is difficult for the moving body to rotate, it is difficult to smoothly rotate the movable-side housing. Meanwhile, as the total number N of the protrusions is reduced, a difference Δ (L1−L2) between the circumferential length L1 of the inner wall surface of the outer cylindrical body and the circumferential length L2 of a polygonal shape, which is formed by connecting the apexes of the respective protrusions in the circumferential direction, is increased. For this reason, the flat cable is likely to slack, so that slack portions are likely to be formed in a gap formed between the outer wall of the inner cylindrical body and the opening of the moving body or in the opening formed in the moving body. Meanwhile, when the total number N of the protrusions exceeds 35, the number of contact points between the flat cable and the regulating walls of the moving body is increased, so that the contact area is increased. For this reason, a sliding friction force generated between the flat cable and the regulating walls of the moving body is increased, so that it is difficult to smoothly rotate the movable-side housing.

In the above-mentioned structure, an opening angle $\theta1$ of the opening on the innermost peripheral side in a radial direction satisfies "$0.5° \leq \theta1 \leq 8°$". In such a structure, it is possible to make the flat cable, which is fed to the outer cylindrical body from the inner cylindrical body, not easily form a slack portion (bulge) in the gap between the outer wall of the inner cylindrical body and the opening of the moving body, to more smoothly move the flat cable in the opening without the buckling of the flat cable, and to rewind the flat cable toward the outer cylindrical body. Meanwhile, when the opening angle $\theta1$ of the opening is smaller than 0.5°, the flat cable is likely to be rubbed against both the regulating walls, which face each other in the circumferential direction, on the innermost peripheral side of the opening in the radial direction. For this reason, since sliding resistance is increased, it is difficult to smoothly move the flat cable in the opening. Incidentally, when the opening angle $\theta1$ of the opening exceeds 8°, the flat cable is deformed so as to slack and enters the opening while bulging. For this reason, there is a problem in that the flat cable is likely to buckle. Here, the opening angle $\theta1$ of the opening is an angle that is formed by straight lines connecting the center of rotation of the moving body with portions, which face each other on the innermost peripheral side in the radial direction, of both the regulating walls that face each other with the opening interposed therebetween.

Further, if apex portions of the respective protrusions have a curved cross-section and are formed so that irregularities are repeated in the direction of a rotational axis of the movable-side housing in the above-mentioned structure, it is possible to further reduce the contact area between the flat cable and the moving body. Accordingly, since it is possible to further reduce the sliding friction force that is generated between the flat cable and the regulating walls of the moving body, it is possible to more smoothly rotate the movable-side housing. Furthermore, since it is difficult for the flat cable to come into close contact with the regulating walls even if a lubricant such as grease adheres between the flat cable and the regulating walls, it is possible to avoid the close contact of the flat cable with the regulating walls. Accordingly, it is possible to more smoothly rotate the movable-side housing and to prevent the flat cable from buckling.

Moreover, if a plurality of the flat cables are received in the annular space, a plurality of the openings are formed in the moving body, and inverted portions of the respective flat cables individually pass through the respective openings in the above-mentioned structure, it is possible to form a rotary connector that uses two or more flat cables.

DESCRIPTION OF THE PREFERRED EMBODIMENTS

The following description is intended to convey a thorough understanding of the embodiments described by providing a number of specific embodiments and details involving a rotary connector. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Embodiments of the disclosure will be described below with reference to the drawings. As shown in FIGS. 1 to 4, a rotary connector may include a stationary-side housing 1 that may be fixed to a steering column portion of an automobile and a movable-side housing 2 into which a steering shaft is inserted and which rotates together with a steering wheel. Flat cables 3 (having a thickness of 135 μm) may be received and wound in an annular space S that may be formed between both the housings 1 and 2.

Figure 4:
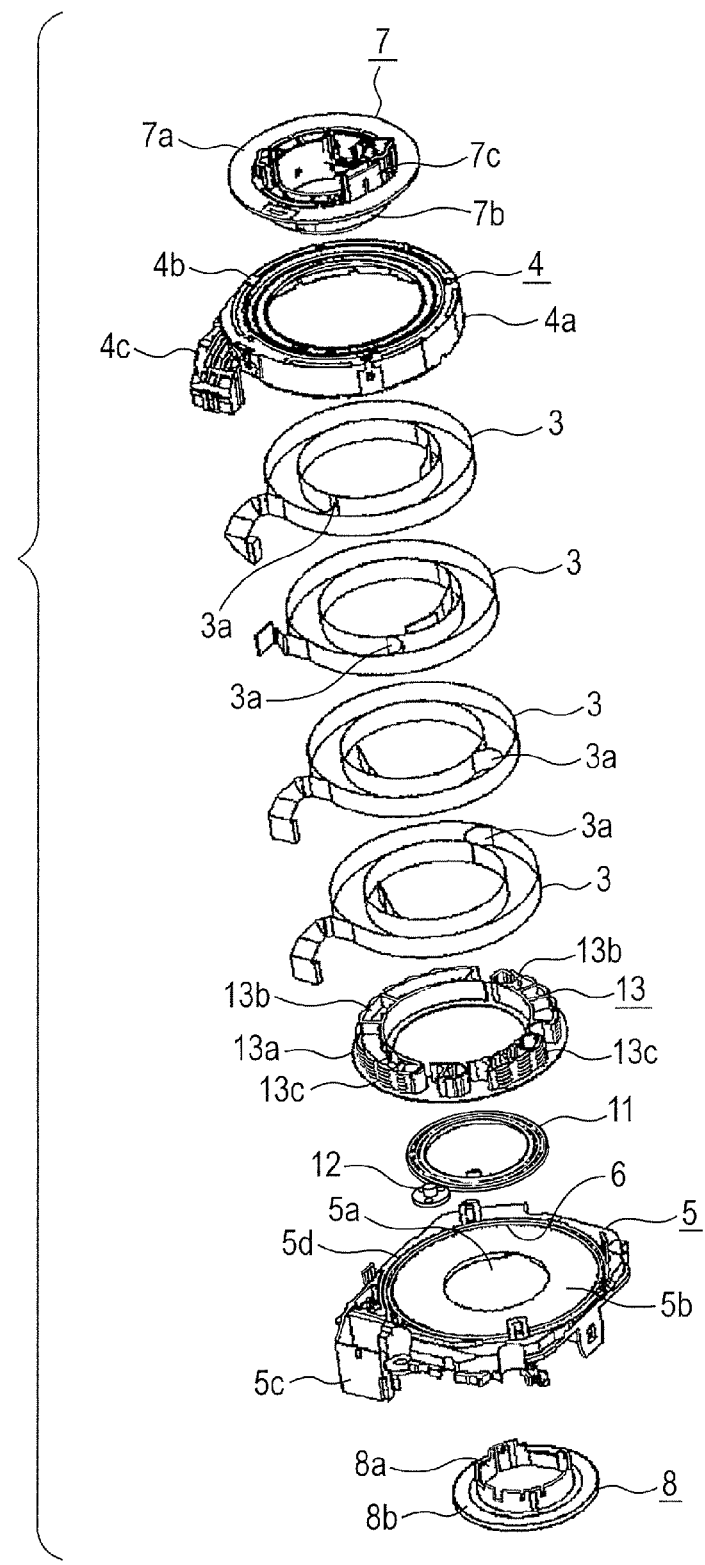
FIG. 4 is an exploded perspective view of the rotary connector according to an embodiment of the disclosure.

The stationary-side housing 1 may include upper and lower cases 4 and 5 made of a synthetic resin, and both the cases 4 and 5 may be connected to and integrated with each other by snap-fitting. As shown in FIG. 4, an outer cylindrical body 4a that may have a substantially perfect circular inner peripheral surface, a ring portion 4b that may protrude inward from the upper end of the outer cylindrical body 4a, and a stationary-side connecting portion 4c that may protrude outward from the outer peripheral surface of the outer cylindrical body 4a may be formed integrally with the upper case 4. The stationary-side connecting portion 4c may be provided with connector terminals (not shown) that electrically connect the outer peripheral ends of the flat cables 3 to a vehicle.

A bottom plate portion 5b that may include a center hole 5a and a connector cover 5c that may protrude downward from a corner portion of the bottom plate portion 5b may be formed on the lower case 5. Accordingly, when the upper and lower cases 4 and 5 are integrated with each other, the stationary-side connecting portion 4c may be connected to the connector cover 5c (see FIG. 1). Further, a stepped wall 5d, which may protrude upward so as to surround the outer edge portion of the bottom plate portion 5b, may be formed on the lower case 5 and an internal gear 6 may be provided on the inner peripheral surface of the stepped wall 5d.

The movable-side housing 2 may include upper and lower rotors 7 and 8 made of a synthetic resin, and both the rotors 7 and 8 may be connected to and integrated with each other by snap-fitting. A top plate portion 7a that overlaps the ring portion 4b of the upper case 4, an inner cylindrical body 7b that protrudes downward from the inner peripheral edge of the top plate portion 7a, and a movable-side connecting portion 7c that protrudes upward from the upper surface of the top plate portion 7a may be formed integrally with the upper rotor 7. The movable-side connecting portion 7c may be provided with a connector terminal group (not shown) that may electrically connect the inner peripheral ends of the flat cables 3 to the steering wheel.

A connecting cylinder portion 8a into which the steering shaft is inserted and a ring-shaped flange portion 8b that extends outward from the lower end of the connecting cylinder portion 8a may be formed on the lower rotor 8. The connecting cylinder portion 8a may be inserted into the center hole 5a from below and may be engaged with the inner cylindrical body 7b, so that the upper and lower rotors 7 and 8 may be snap-fitted to each other. Accordingly, since the top plate portion 7a of the upper rotor 7 slidably faces the upper surface of the ring portion 4b and the flange portion 8b of the lower rotor 8 slidably faces the lower surface of the bottom plate portion 5b, the position of the movable-side housing 2 (the upper and lower rotors 7 and 8) may be regulated in the direction of an axis and the movable-side housing 2 may be rotatably connected to the stationary-side housing 1. Further, in this state, the outer cylindrical body 4a and the inner cylindrical body 7b face each other in a horizontal direction and the ring portion 4b and the top plate portion 7a face the bottom plate portion 5b in a vertical direction. Accordingly, the above-mentioned annular space S is formed by these members.

Figure 5:
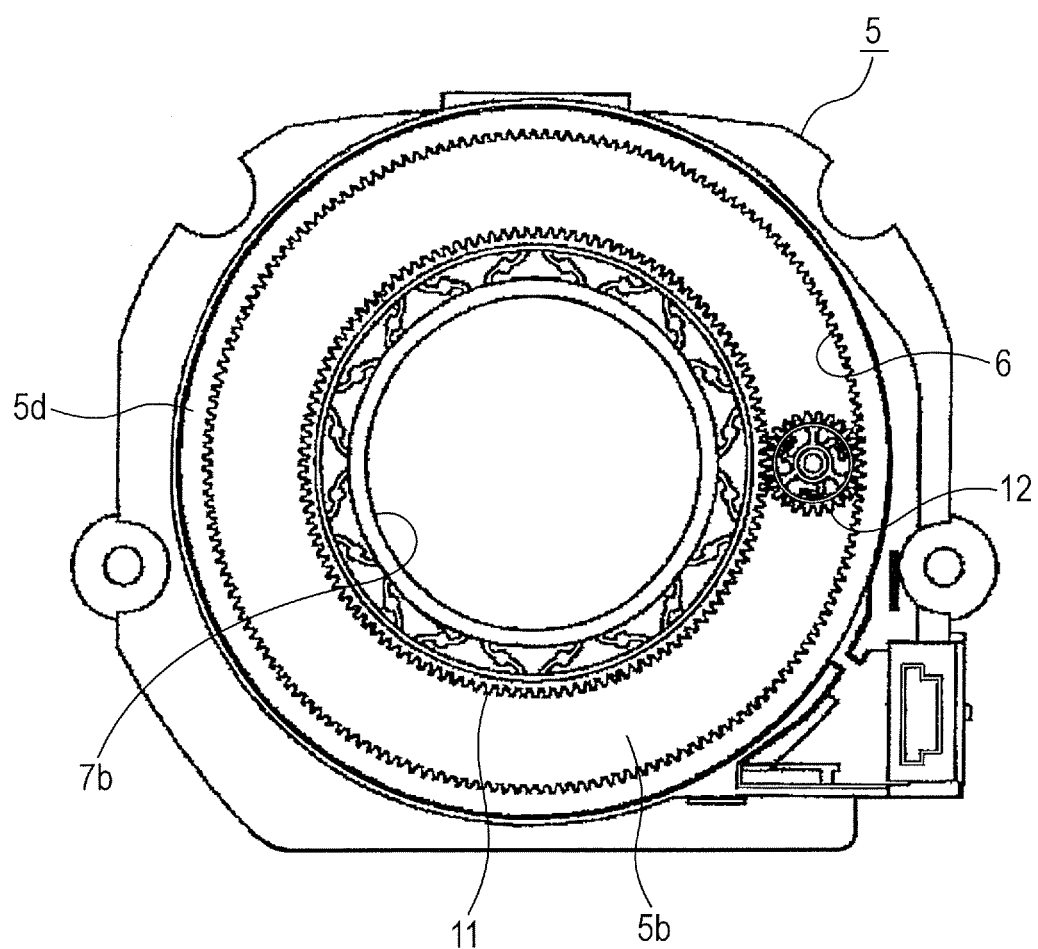
FIG. 5 is an explanatory view showing a state in which a planetary gear of the rotary connector meshes with each gear according to an embodiment of the disclosure.

A sun gear 11 may be fixed to the lower end portion of the inner cylindrical body 7b of the upper rotor 7, and a planetary gear 12 may mesh respectively with the internal gear 6 provided on the lower case 5 and the sun gear 11 as shown in FIG. 5. Accordingly, when the movable-side housing 2 may rotate relative to the stationary-side housing 1, the planetary gear 12 meshing with both the gears 6 and 11 may revolve while rotating on the bottom plate portion 5b.

Figure 6:
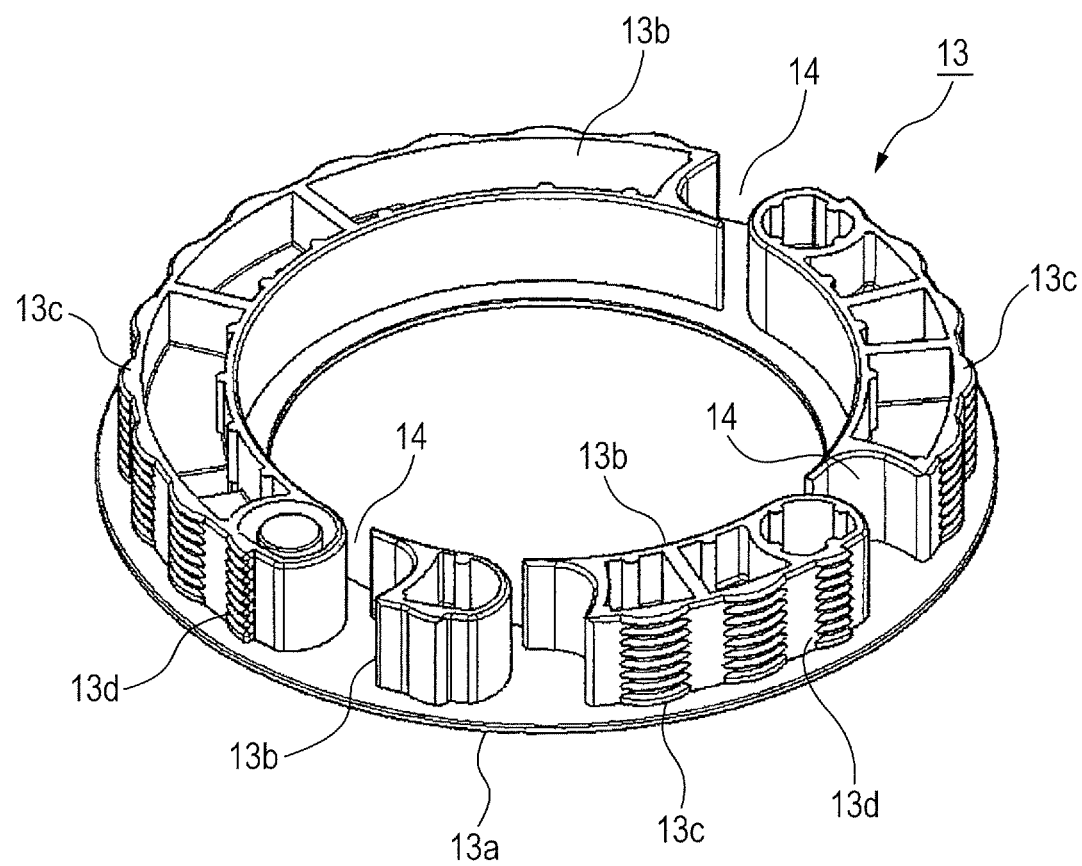
FIG. 6 is a perspective view of a moving body of the rotary connector according to an embodiment of the disclosure.
Figure 7:
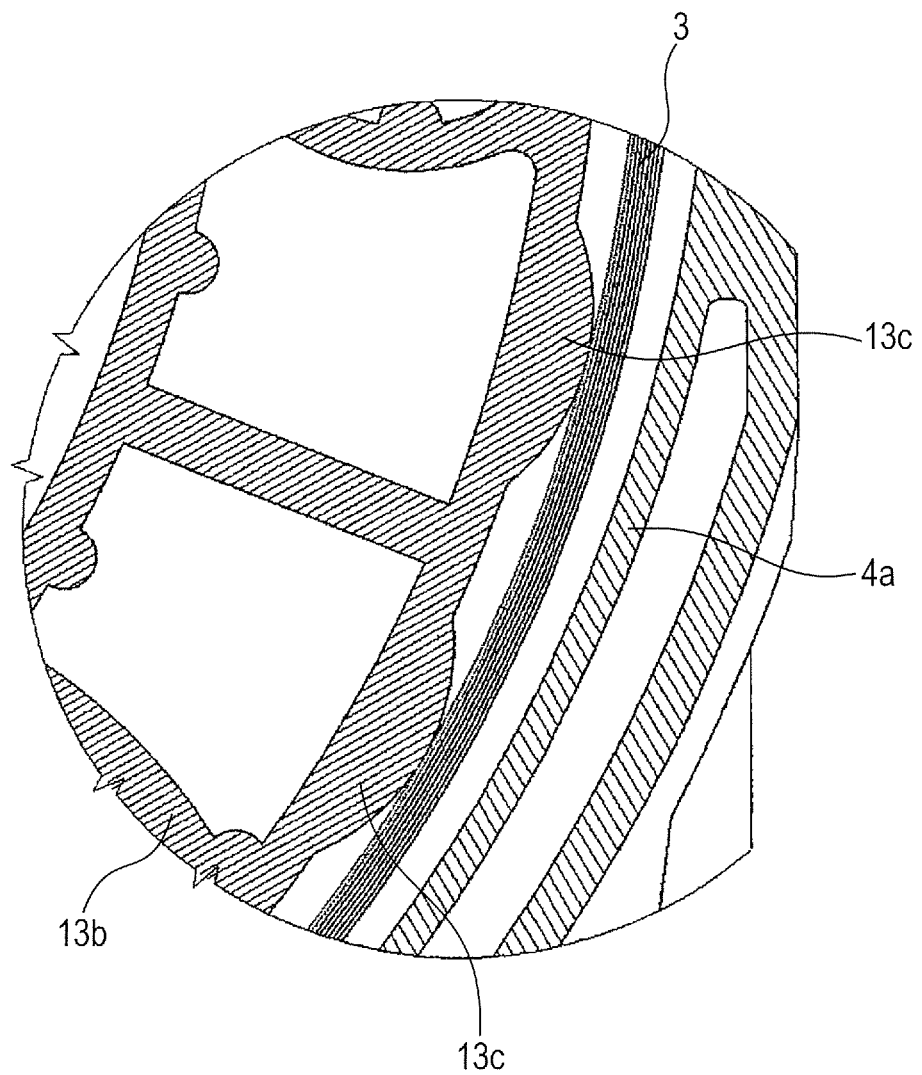
FIG. 7 is an enlarged view of a portion VII of FIG. 3.

A moving body 13 that is formed of a molded product made of a synthetic resin and a plurality of flat cables 3 may be received in the annular space S, and the moving body 13 may be formed so that a plurality of regulating walls 13b are erected on a ring-shaped flat plate portion 13a as shown in FIG. 6. The above-mentioned planetary gear 12 may be supported by the lower surface of the flat plate portion 13a. Accordingly, when the planetary gear 12 rotates and revolves, the moving body 13 may turn in the annular space S. The plurality of regulating walls 13b may extend so as to be successively arranged in the circumferential direction of the flat plate portion 13a, and openings 14 may be secured between pairs of regulating walls 13b, which may be adjacent to each other in the circumferential direction, respectively. In such an embodiment, four regulating walls 13b, which have different circumferential lengths, may be erected on the flat plate portion 13a and four openings 14 having the same size are formed between the respective regulating walls 13b.

Figure 1:
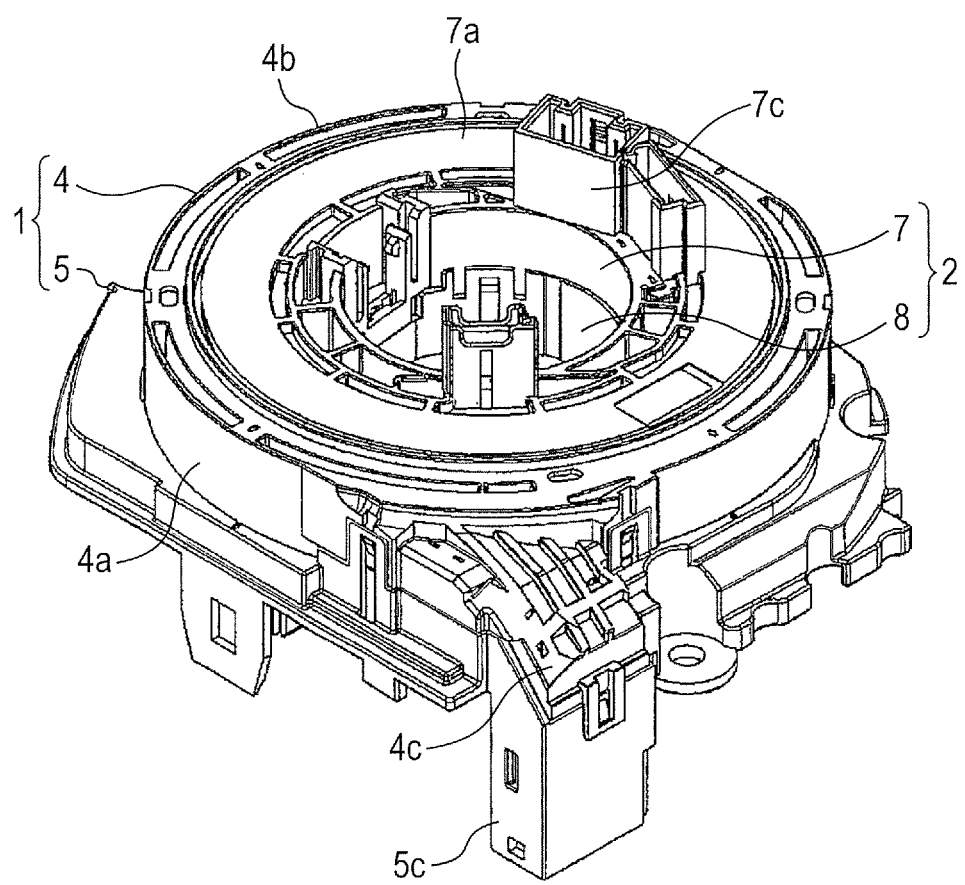
FIG. 1 is a perspective view showing the appearance of a rotary connector according to an embodiment of the disclosure.
Figure 2:
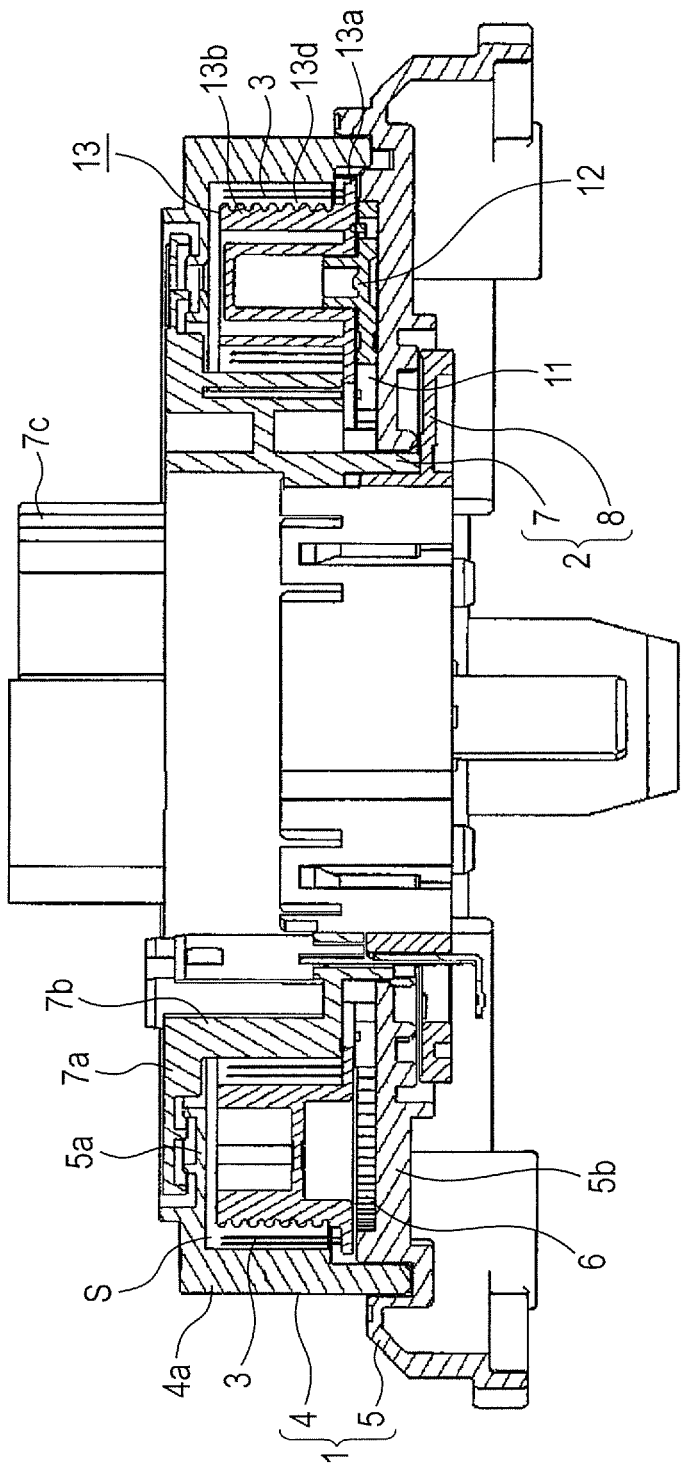
FIG. 2 is a longitudinal sectional view of the rotary connector according to an embodiment of the disclosure.
Figure 3:
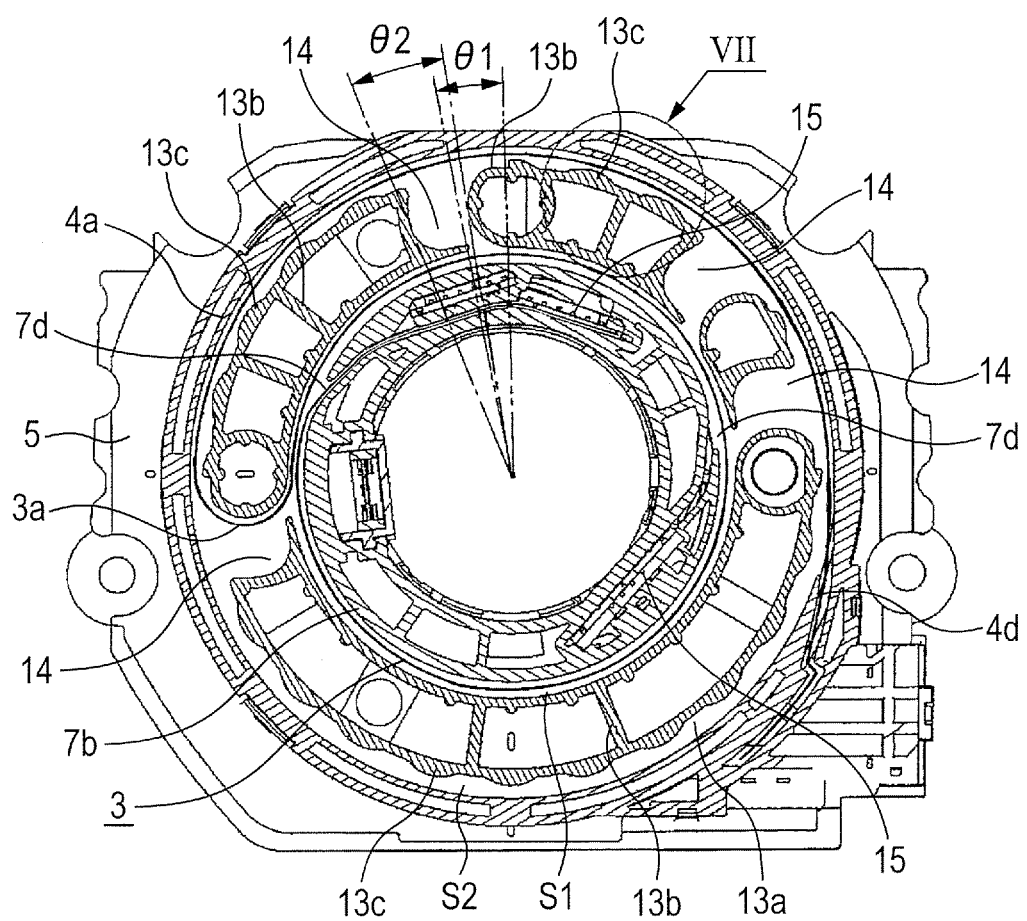
FIG. 3 is a cross-sectional view of the rotary connector according to an embodiment of the disclosure.

As shown in FIG. 3, the inner peripheral surfaces of the respective regulating walls 13b of the moving body 13 may be successively formed in a perfectly circular shape. Accordingly, a gap S1 having a constant width may be secured between the inner peripheral surfaces of these regulating walls 13b and the outer peripheral surface of the inner cylindrical body 7b. Meanwhile, since a plurality of protrusions 13c may be formed on the outer peripheral surfaces of the other regulating walls 13b except for one regulating wall 13b, a gap S2 of which the inner peripheral side has a wavy shape is secured between the outer peripheral surfaces of these regulating walls 13b and the inner peripheral surface of the outer cylindrical body 4a. That is, in plan view, the outer peripheral surfaces of the regulating walls 13b may be formed in a wavy shape in which the protrusions 13c and recesses are alternately repeated in the circumferential direction. Accordingly, a polygonal shape may be formed when the apexes of the respective protrusions 13c are connected to each other in the circumferential direction. In such an embodiment, a total of nineteen protrusions 13c may be formed on the outer peripheral surfaces of the four regulating walls 13b. Accordingly, a polygonal shape, which may be formed when the apexes of the respective protrusions 13c are connected to each other in the circumferential direction, has nineteen sides. Further, crest portions and recessed grooves 13d, which extend in the circumferential direction, are formed on the outer peripheral surface of each protrusion 13c so as to be repeated in the direction of a rotational axis (see FIG. 2).

The flat cable 3 may be a strip-shaped body in which a conductor is supported on an insulating film such as PET, and an insulating film having a small thickness (so-called low stiffness) is used. A plurality of flat cables 3 may be received in the annular space S so that the winding directions of the flat cables 3 are reversed at the middle portions of the flat cables 3. In such an embodiment, four flat cables 3 may be received in the annular space S together with the moving body 13. However, only one flat cable 3 is shown in FIG. 3, and the other three flat cables 3 are not shown. After being connected to a joint portion (not shown), which may be provided inside the outer cylindrical body 4a, through a cable leading portion 4d formed in the outer cylindrical body 4a, an outer peripheral end of the flat cable 3 may be electrically led to the above-mentioned stationary-side connecting portion 4c through the joint portion. Further, after being connected to a joint portion 15, which is provided inside the inner cylindrical body 7b, through a cable leading portion 7d formed in the inner cylindrical body 7b, an inner peripheral end of the flat cable 3 may be electrically led to the above-mentioned movable-side connecting portion 7c through the joint portion 15. At that time, after being wound counterclockwise on the outer peripheral surface of the inner cylindrical body 7b in the gap S1, the flat cable 3, which is led to the gap S1 from the cable leading portion 7d, is inverted in a U shape in one opening 14 of the moving body 13 (hereinafter, this is referred to as an inverted portion 3a) and is fed to the gap S2. Moreover, after being wound clockwise on the inner peripheral surface of the outer cylindrical body 4a in the gap S2, the flat cable 3 is received in the annular space S so as to reach the stationary-side connecting portion 4c (see FIG. 4) from the cable leading portion 4d. Meanwhile, after the other three flat cables 3 (not shown) are wound counterclockwise on the outer peripheral surface of the inner cylindrical body 7b in the gap S1, the respective inverted portions 3a individually pass through the other openings 14 of the moving body 13 and are fed to the gap S2. After being wound clockwise on the inner peripheral surface of the outer cylindrical body 4a in the gap S2, the other three flat cables 3 may be received in the annular space S so as to reach the stationary-side connecting portion 4c from the cable leading portion 4d.

In the rotary connector having this structure, when the movable-side housing 2 rotates in any one direction of a normal direction and a reverse direction while interlocking with the steering wheel, each of the flat cables 3 may be fed from the inner cylindrical body 7b so as to be rewound on the outer cylindrical body 4a or, conversely, may be fed from the outer cylindrical body 4a so as to be tightly wound on the inner cylindrical body 7b according to the rotation direction of the movable-side housing 2. Accordingly, each of the inverted portions 3a may be moved in the same direction as the direction of the movable-side housing 2 by a rotation angle smaller than the rotation angle of the movable-side housing 2. Further, since the sun gear 11 rotates relative to the internal gear 6 simultaneously with this, the planetary gear 12 meshing with both the gears 6 and 11 may rotate and revolve on the bottom plate portion 5b and the moving body 13 supporting the planetary gear 12 turns in the annular space S. At that time, since the gear ratios of the internal gear 6, the sun gear 11, and the planetary gear 12 are set so that the moving speeds of the inverted portions 3a of the flat cables are the same as the moving speeds of the openings 14 of the moving body 13, the respective inverted portions 3a may be fed toward the corresponding openings 14 while the movements of the four flat cables 3 in the radial direction are regulated by the regulating walls 13b of the moving body 13.

However, when the flat cables 3 pass through the openings 14 of the moving body 13 from the inner cylindrical body 7b and are rewound on the outer cylindrical body 4a, the flat cables 3 are not always rewound on the inner peripheral surface of the outer cylindrical body 4a in a circular shape and may get out of the inner peripheral surface of the outer cylindrical body 4a and be displaced toward the protrusions 13c formed on the outer peripheral surfaces of the regulating walls 13b. In particular, when flat cables 3 having small thickness and low stiffness are used, such a phenomenon is easily caused by the friction between the flat cables 3. For this reason, in the rotary connector according to this embodiment, the protrusions 13c may be repeatedly formed at regular intervals in the circumferential direction so that the total number N of the protrusions 13c is set so as to satisfy "11≤N≤35". Accordingly, it is possible to simplify the structure of the moving body 13 in the form of an integrated part, to reduce noise since rollers are not needed, and to allow the movable-side housing 2 to smoothly rotate.

Here, when the total number N of the protrusions 13c is smaller than 11 and when the total number N of the protrusions 13c exceeds 35, it is difficult to smoothly rotate the movable-side housing 2. For example, when the total number N of the protrusions 13c is smaller than 11, a large slack portion (bulge) is likely to be formed due to the slack occurring on the flat cable 3 that is fed to the outer cylindrical body 4a from the inner cylindrical body 7b. Further, since the flat cable 3 is not fed to the outer cylindrical body 4a by a length corresponding to the slack portion when the slack portion is formed on the flat cable 3, the flat cable 3 wound on the outer cylindrical body 4a is pulled toward the inner cylindrical body 7b. As a result, the flat cable 3 may press the outer peripheries of the regulating walls 13b of the moving body 13, so that a sliding friction force generated between the flat cable 3 and the regulating walls 13b of the moving body 13 is increased. For this reason, since it is difficult for the moving body 13 to rotate, it is difficult to smoothly rotate the movable-side housing 2. Meanwhile, as the total number N of the protrusions 13c is reduced, a difference Δ (L1−L2) between the circumferential length L1 of the inner wall surface of the outer cylindrical body 4a and the circumferential length L2 of a polygonal shape, which is formed by connecting the apexes of the respective protrusions 13c in the circumferential direction, is increased. For this reason, the flat cable 3 is likely to slack, so that slack portions are likely to be formed in gaps formed between the outer wall of the inner cylindrical body 7b and the openings 14 of the moving body 13 or in the openings 14 formed in the moving body 13. Meanwhile, when the total number N of the protrusions 13c exceeds 35, the number of contact points between the flat cable 3 and the regulating walls 13b of the moving body 13 may be increased, so that the contact area may be increased. For this reason, a sliding friction force generated between the flat cable 3 and the regulating walls 13b of the moving body 13 is increased, so that it is difficult to smoothly rotate the movable-side housing 2.

Further, when an opening angle of the opening 14 on the innermost peripheral side in the radial direction is denoted by θ1 as shown in FIG. 3, the opening angle θ1 may be set so as to satisfy "0.5°≤θ1≤8°". Accordingly, it is possible to make the flat cable 3, which is fed to the outer cylindrical body 4a from the inner cylindrical body 7b, not easily form slack portions (bulges) in the gaps or the like between the outer wall of the inner cylindrical body 7b and the openings 14 of the moving body 13, to more smoothly move the flat cable 3 in the openings 14 without the buckling of the flat cable 3, and to rewind the flat cable 3 toward the outer cylindrical body 4a. Meanwhile, when the opening angle θ1 of the opening 14 is smaller than 0.5°, the flat cable 3 is likely to be rubbed against both the regulating walls 13b, which face each other in the circumferential direction, on the innermost peripheral side of the opening 14 in the radial direction. For this reason, since sliding resistance is increased, it is difficult to smoothly move the flat cable 3 in the opening 14. Incidentally, when the opening angle θ1 of the opening 14 exceeds 8°, the flat cable 3 may be deformed so as to slack and enters the opening 14 while bulging. For this reason, there is a problem in that the flat cable 3 is likely to buckle. Here, the opening angle θ1 of the opening 14 is an angle that is formed by straight lines connecting the center of rotation of the moving body 13 with portions, which face each other on the innermost peripheral side in the radial direction, of both the regulating walls 13b that face each other with the opening 14 interposed therebetween.

Meanwhile, when an opening angle of a middle portion of the opening 14 in the circumferential direction near the middle portion of the opening 14 in the radial direction is denoted by θ2, the opening angle θ2 is set so as to satisfy "15°≤θ2≤20°". Accordingly, a space formed in the opening 14 can be sufficiently secured, so that the slack portion of the flat cable 3, which is not rewound on the outer cylindrical body 4a, can be formed so as to become larger in the opening 14. Accordingly, even if slack occurs on the flat cable 3 and the flat cable 3 wound on the outer cylindrical body 4a is pulled toward the inner cylindrical body 7b, the slack portion formed in the opening 14 may be pulled toward the outer cylindrical body 4a by a pulling force. Therefore, it is possible to prevent the flat cable 3 from being pressed against the outer walls of the regulating walls 13b, so that it is possible to prevent a sliding friction force, which is generated between the flat cable 3 and the regulating walls 13b of the moving body 13, from being increased. As a result, it may be possible to more smoothly rotate the movable-side housing 2. When the opening angle θ2 of the middle portion of the opening 14 in the circumferential direction is smaller than 15°, the size of the slack portion of the flat cable 3, which is not rewound on the outer cylindrical body 4a, is reduced in the opening 14, so that a sliding friction force, which is generated between the flat cable 3 and the outer walls of the regulating walls 13b, is likely to increase. For this reason, there is a problem in that the movable-side housing 2 is not smoothly rotated. Incidentally, when the opening angle θ2 of the opening 14 exceeds 20°, the movements of the inner and outer portions of the flat cable 3, which is present in the opening 14, in the radial direction are increased. For this reason, there is a problem in that it is not possible to regulate the movement of the flat cable 3 in the radial direction.

As described above, in the rotary connector according to this embodiment, the regulating walls 13b, which extend in the circumferential direction with the openings 14 interposed therebetween, are erected on the moving body 13, which turns in the annular space S with the rotation and revolution of the planetary gear 12, and the inverted portions 3a may pass through the openings 14 so that the movements of the flat cables 3 in the radial direction are regulated. Accordingly, it is possible to simplify the structure of the moving body 13 in the form of an integrated part and to reduce noise since rollers are not needed. Further, the plurality of protrusions 13c, which may protrude toward the inner peripheral surface of the outer cylindrical body 4a, have been formed on the outer peripheral surfaces of the regulating walls 13b and the protrusions 13c are repeatedly formed at regular intervals in the circumferential direction so that the total number N of these protrusions 13c satisfies "11≤N≤35". Accordingly, since the number of parts of the moving body 13 is reduced and assembly is simplified, cost is reduced. Furthermore, since it is possible to reduce the sliding friction force that is generated between the flat cable 3 and the outer peripheral surfaces of the regulating walls 13b of the moving body 13, it is possible to smoothly rotate the movable-side housing 2.

Moreover, when an opening angle of the opening 14 on the innermost peripheral side in the radial direction is denoted by θ1, the opening angle θ1 is set so as to satisfy "0.5°≤θ1≤8°". Accordingly, it is possible to make the flat cable 3, which is fed to the outer cylindrical body 4a from the inner cylindrical body 7b, not easily form slack portions (bulges) in the gaps or the like between the outer wall of the inner cylindrical body 7b and the openings 14 of the moving body 13, to more smoothly move the flat cable 3 in the opening 14 without the buckling of the flat cable 3, and to rewind the flat cable 3 toward the outer cylindrical body 4a.

Further, since apex portions of the respective protrusions 13c, which may be formed on the outer peripheral surfaces of the regulating walls 13b of the moving body 13, have a curved cross-section and are formed so that irregularities are repeated in the direction of a rotational axis of the movable-side housing 2, it is possible to further reduce the contact area between the flat cable 3 and the moving body 13. Accordingly, since it is possible to further reduce the sliding friction force that is generated between the flat cable 3 and the regulating walls 13b of the moving body 13, it is possible to more smoothly rotate the movable-side housing 2. Furthermore, since it is difficult for the flat cable 3 to come into close contact with the regulating walls 13b even if a lubricant such as grease adheres between the flat cable 3 and the regulating walls 13b, it is possible to avoid the close contact of the flat cable 3 with the regulating walls 13b. For this reason, it is possible to more smoothly rotate the movable-side housing 2 and to prevent the flat cable 3 from buckling.

Moreover, since the plurality of (four) flat cables 3 are received in the annular space S and the plurality of (four) openings 14 through which the inverted portions 3a of the respective flat cables 3 individually pass are formed in the moving body 13, it is possible to form a rotary connector that uses two or more flat cables 3. However, the number of the openings 14 formed in the moving body 13 may not be necessarily the same as the number of the flat cables 3 to be used. For example, if four openings 14 are formed in the moving body 13 in advance and only two openings of the four openings 14 are used as spaces in which the inverted portions 3a are disposed, it is possible to form a rotary connector of which the number of flat cables 3 varies by using a common moving body 13.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A rotary connector comprising:
a stationary-side housing that includes an outer cylindrical body;
a movable-side housing that includes an inner cylindrical body facing the outer cylindrical body and is disposed coaxially with the stationary-side housing;
a flat cable which is received in an annular space defined between the outer and inner cylindrical bodies so that the winding direction of the flat cable is reversed at a middle portion of the flat cable, and of which both ends are fixed to the stationary-side housing and the movable-side housing, respectively; and
a moving body which is turnably disposed in the annular space and includes an opening through which an inverted portion of the flat cable passes,
wherein a planetary gear supported by the moving body meshes with an internal gear provided on the stationary-side housing and a sun gear provided on the movable-side housing, and
regulating walls, which extend in a circumferential direction of the annular space with the opening interposed therebetween, are erected on the moving body, and a plurality of protrusions, which protrude toward an inner peripheral surface of the outer cylindrical body, are repeatedly formed on outer peripheral surfaces of the regulating walls at regular intervals in the circumferential direction so that the total number N of the protrusions satisfies "11≤N≤35", wherein
wherein an opening angle θ1 of the opening on the innermost peripheral side in a radial direction is greater than approximately 0.5°.

2. The rotary connector according to claim 1,
wherein apex portions of the respective protrusions have a curved cross-section, and are formed so that irregularities are repeated in the direction of a rotational axis of the movable-side housing.

3. The rotary connector according to claim 1,
wherein a plurality of the flat cables are received in the annular space, a plurality of the openings are formed in the moving body, and inverted portions of the respective flat cables individually pass through the respective openings.

4. A rotary connector comprising:
a stationary-side housing that includes an outer cylindrical body;
a movable-side housing that includes an inner cylindrical body facing the outer cylindrical body and is disposed coaxially with the stationary-side housing;
a flat cable which is received in an annular space defined between the outer and inner cylindrical bodies so that the winding direction of the flat cable is reversed at a middle portion of the flat cable, and of which both ends are fixed to the stationary-side housing and the movable-side housing, respectively; and
a moving body which is turnably disposed in the annular space and includes an opening through which an inverted portion of the flat cable passes,
wherein a planetary gear supported by the moving body meshes with an internal gear provided on the stationary-side housing and a sun gear provided on the movable-side housing, and
regulating walls, which extend in a circumferential direction of the annular space with the opening interposed therebetween, are erected on the moving body, and a plurality of protrusions, which protrude toward an inner peripheral surface of the outer cylindrical body, are repeatedly formed on outer peripheral surfaces of the regulating walls at regular intervals in the circumferential direction so that the total number N of the protrusions satisfies "11≤N≤35",
wherein an opening angle θ1 of the opening on the innermost peripheral side in a radial direction is less than approximately 8°.

5. The rotary connector according to claim 4,
wherein apex portions of the respective protrusions have a curved cross-section, and are formed so that irregularities are repeated in the direction of a rotational axis of the movable-side housing.

6. The rotary connector according to claim 4,
wherein a plurality of the flat cables are received in the annular space, a plurality of the openings are formed in the moving body, and inverted portions of the respective flat cables individually pass through the respective openings.

7. A rotary connector comprising:
a stationary-side housing that includes an outer cylindrical body;
a movable-side housing that includes an inner cylindrical body facing the outer cylindrical body and is disposed coaxially with the stationary-side housing;
a flat cable which is received in an annular space defined between the outer and inner cylindrical bodies so that the winding direction of the flat cable is reversed at a middle portion of the flat cable, and of which both ends are fixed to the stationary-side housing and the movable-side housing, respectively: and
a moving body which is turnably disposed in the annular space and includes an opening through which an inverted portion of the flat cable passes,
wherein a planetary gear supported by the moving body meshes with an internal gear provided on the stationary-side housing and a sun gear provided on the movable-side housing, and
regulating walls, which extend in a circumferential direction of the annular space with the opening interposed therebetween, are erected on the moving body, and a plurality of protrusions, which protrude toward an inner peripheral surface of the outer cylindrical body, are repeatedly formed on outer peripheral surfaces of the regulating walls at regular intervals in the circumferential direction so that the total number N of the protrusions satisfies "11≤N≤35",
wherein an opening angle θ1 of the opening on the innermost peripheral side in a radial direction has a range between approximately 0.5° and 8°.

8. The rotary connector according to claim 7,
wherein apex portions of the respective protrusions have a curved cross-section, and are formed so that irregularities are repeated in the direction of a rotational axis of the movable-side housing.

9. The rotary connector according to claim 7,
wherein a plurality of the flat cables are received in the annular space, a plurality of the openings are formed in the moving body, and inverted portions of the respective flat cables individually pass through the respective openings.

* * * * *